us011907651B2

(12) United States Patent
Kawashima

(10) Patent No.: US 11,907,651 B2
(45) Date of Patent: Feb. 20, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Takayuki Kawashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/722,177

(22) Filed: Apr. 15, 2022

(65) Prior Publication Data
US 2022/0350956 A1 Nov. 3, 2022

(30) Foreign Application Priority Data
Apr. 28, 2021 (JP) .................................. 2021-076110

(51) Int. Cl.
*G06F 40/00* (2020.01)
*G06F 40/174* (2020.01)
*G06V 30/14* (2022.01)
*G06V 30/412* (2022.01)
*G06V 30/418* (2022.01)
*G06V 30/42* (2022.01)

(52) U.S. Cl.
CPC ........ *G06F 40/174* (2020.01); *G06V 30/1444* (2022.01); *G06V 30/412* (2022.01); *G06V 30/418* (2022.01); *G06V 30/42* (2022.01)

(58) Field of Classification Search
CPC .............. G06F 40/174; G06V 30/1444; G06V 30/412; G06V 30/418; G06V 30/42
See application file for complete search history.

(56) References Cited

U.S. PATENT DOCUMENTS

| 10,929,657 | B2 * | 2/2021 | Matsumoto | ........ G06V 30/1444 |
| 2013/0110499 | A1 * | 5/2013 | Yamaguchi | ............. G06F 40/30 |
| | | | | 704/9 |
| 2013/0202208 | A1 * | 8/2013 | Ide | ........................ G06V 30/224 |
| | | | | 704/9 |
| 2015/0363377 | A1 * | 12/2015 | Dojo | ..................... G06F 40/174 |
| | | | | 715/224 |
| 2016/0117300 | A1 * | 4/2016 | Hatada | ..................... G06F 16/26 |
| | | | | 715/256 |
| 2019/0087444 | A1 * | 3/2019 | Arakawa | .............. H04N 1/4074 |
| 2019/0228220 | A1 * | 7/2019 | Matsumoto | .......... G06V 30/418 |
| 2019/0266397 | A1 * | 8/2019 | Arakawa | .............. G06V 30/418 |
| 2021/0103633 | A1 * | 4/2021 | Sardo | ..................... G06F 40/16 |

FOREIGN PATENT DOCUMENTS

JP       2000-003404       1/2000

* cited by examiner

Primary Examiner — Cesar B Paula
Assistant Examiner — David Faber
(74) Attorney, Agent, or Firm — Venable LLP

(57) ABSTRACT

The information processing apparatus analyzes the results of modification performed by user for a recommended character string and determines whether there is an excess or a lack in units of predetermined character string areas in a recommended area corresponding to the recommended character string. In a case where it is determined that there is an excess or a lack as a result of the determination, a recommended character string that eliminates the excess or the lack is specified. Then, area information for specifying the recommended area, which is registered in a database, is updated so that the character string corresponding to the specified recommended area becomes the recommended character string.

5 Claims, 18 Drawing Sheets

FIG.7A
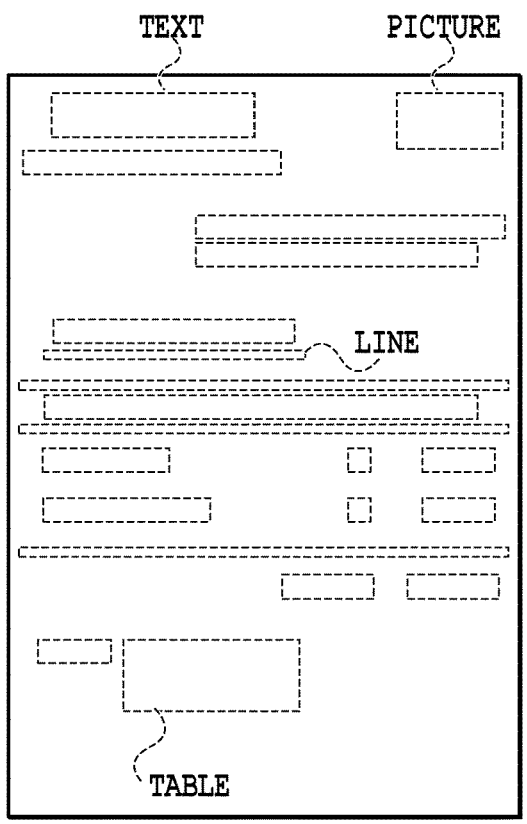
FIG.7B
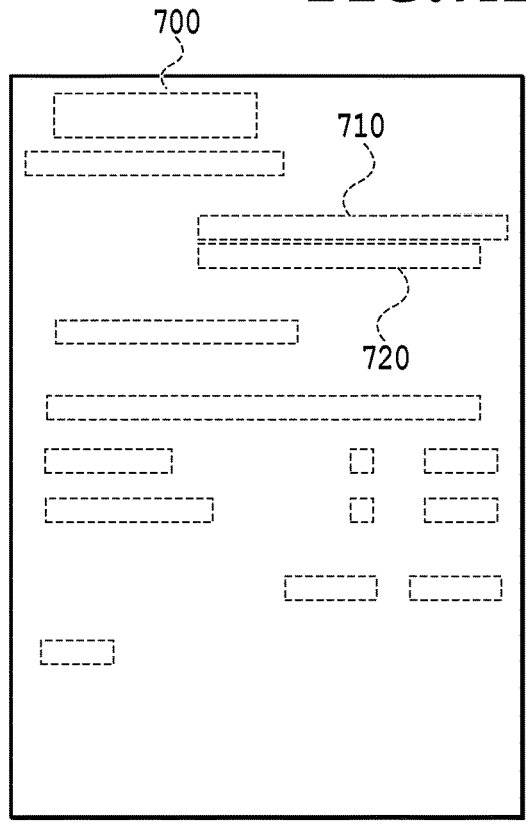
FIG.7C
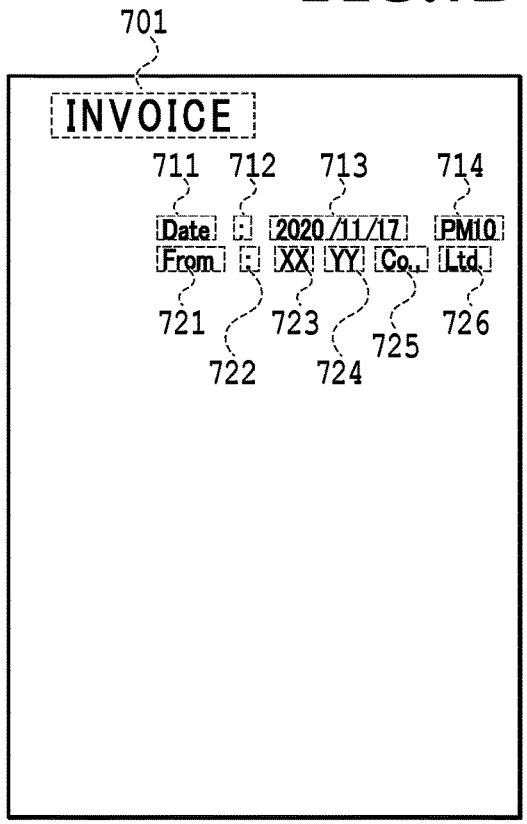
FIG.7D

FIG.8

| Business Form ID | Thumbnail | Arrangement Information on Character Area | Unit Character String Area Information |
|---|---|---|---|
| 0001 | INVOICE<br>To : HI JK Company<br>Date : 2020/11/17 PM10<br>From : XX YY Co., Ltd.<br>Title : Test Project<br>ID  Description  Quantity  Line Total<br>P01  Product 1  3  250.00<br>P02  Product 2C  5  100.00<br>Total  350.00<br>Notes : | | 1311 1312 1310 1313 |

FIG.13A

INFORMATION PROCESSING APPARATUS, INFORMATION PROCESSING METHOD, AND STORAGE MEDIUM

BACKGROUND

Field

The present disclosure relates to a technique to recommend a character string that is used for property setting at the time of electronizing a business form.

Description of the Related Art

Conventionally, there is a business form management system that attaches a file name to a business form image obtained by scanning a paper business form and stores the business form image in a predetermined storage. Then, as a method of assisting in the input work of a character string that is used as a property, such as a file name and a folder path, at the time of storage, it is also performed to recommend a character string to a user, which corresponds to a predetermined item, from character recognition results obtained by performing OCR for the business form image. Here, OCR is an abbreviation of "Optical Character Recognition". A user checks the recommended character string and in a case where there is no problem, gives instructions to store the recommended contents as they are in a storage, or in a case where modification is necessary, the user modifies the recommended contents and settles the file name and the like and gives instructions to store the modified contents in a storage. Further, in the business form management system such as this, in order to extract a character string that is used as a file name or the like from the character recognition results, it is necessary to register in advance form information, such as the position of an extraction-target character string, for each business form type. Japanese Patent Laid-Open No. 2000-3403 has disclosed a technique to make it possible for a user to perform input work effectively by performing registration of form information and modification work of character recognition results in a series of flows of the input work.

With the technique of Japanese Patent Laid-Open No. 2000-3403 described above, it is necessary for a user to designate a character recognition area on a business form image by using an input device, such as a mouse, at the time of modifying the displayed character recognition results and this is complicated work for the user.

SUMMARY

The technique of the present disclosure has been made in view of the above-described point and an object is to eliminate complicatedness of the user operation at the time of modifying a recommended character string and improve usability.

The information processing apparatus according to the present disclosure is an information processing apparatus for recommending, based on results of character recognition for a character area within a business form, a specific character string to be used for setting a property of the business form, and includes: one or more memories storing instructions; and one or more processors executing the instructions to: specify a business form similar to an input business form by referring to a database in which information including a feature of a business form is registered; determine a recommended area in the input business form based on area information associated with the information about the specified similar business form, which is registered in the database; output a character string included in the recommended area as the specific character string; analyze of modification, performed by a user, for the output specific character string; and update the area information about the similar business form, which is registered in the database, based on results of the analysis, wherein in the analysis, in a case where it is determined that there is an excess or a lack of the recommended area in units of predetermined character string areas during the analysis, a recommended area that eliminates the excess or the lack is specified and in the updating, the area information about the similar business form, which is registered in the database, is updated so that a character string corresponding to the specified recommended area becomes the specific character string.

Further features of the present disclosure will become apparent from the following description of exemplary embodiments with reference to the attached drawings.

BRIEF DESCRIPTION OF THE DRAWINGS

FIG. 7A is a diagram showing an example of a business form image, FIG. 7B is a diagram showing an example of results of block selection processing, FIG. 7C is a diagram showing a state where character areas are extracted, and FIG. 7D is a diagram showing unit character string areas;

FIG. 8 is a diagram showing an example of business form information;

FIG. 13A and FIG. 13B are each a diagram explaining updating of business form information;

DESCRIPTION OF THE EMBODIMENTS

In the following, aspects for embodying the present invention are explained by using the drawings. The following embodiments are not intended to limit the invention according to the claims and all combinations of features explained in the embodiments are not necessarily indispensable to the solution of the invention.

First Embodiment

<General Configuration of System>

Figure 1:
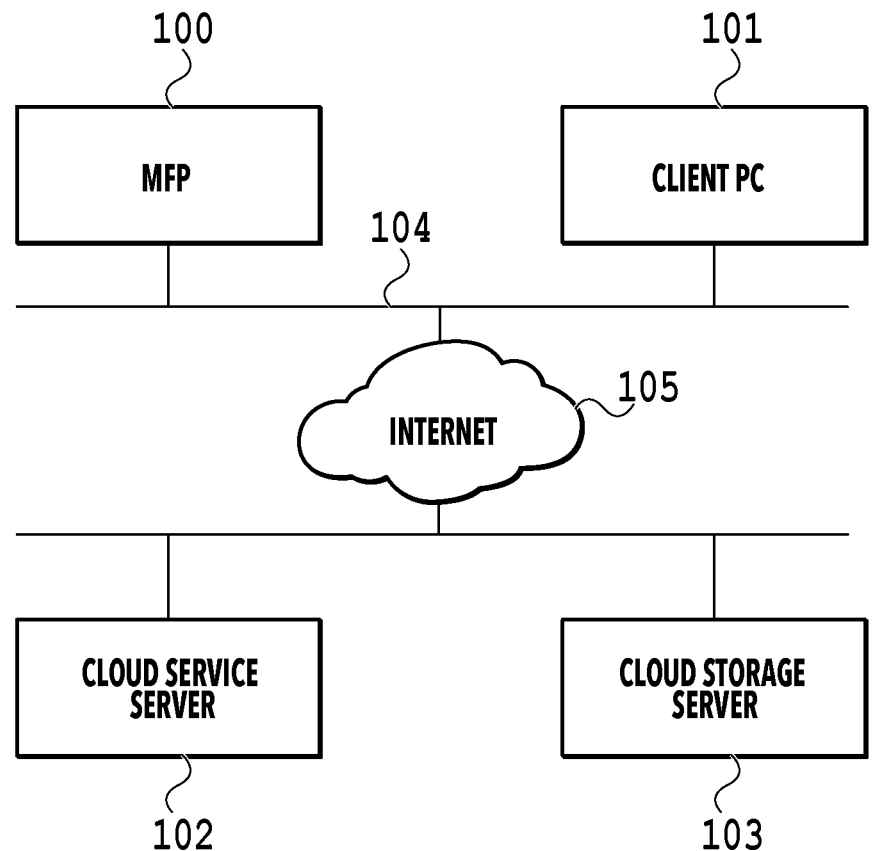
FIG. 1 is a diagram showing an example of a general configuration of a business form management system.

FIG. 1 is a diagram showing an example of the general configuration of a business form management system according to the present embodiment. The business form management system includes an MFP (Multifunction Peripheral) 100, a client PC 101, a cloud service server 102, and a cloud storage server 103. The MFP 100 and the client PC 101 are connected to a server that provides various services on the internet via a LAN (Local Area Network) 104 so as to be capable of communication.

The MFP 100 is a multifunction peripheral having a plurality of functions, such as the function as a scanner and the function as a printer, and is an example of an image processing apparatus. The client PC 101 is a computer that receives a service that the cloud server 102 is requested to provide by the client PC 101 using an installed business form management application. The cloud service server 102 is a server having a function to electronize a business form image obtained by a scan in the MFP 100 and store the filed business form image on the cloud service server 102 itself, transfer the filed business form image to another storage server and the like, and so on. The cloud storage server 103 is a server having a function to store electronized business form data, provide stored business form data in response to a request via a web browser, and so on.

The business form management system of the present embodiment has the configuration including the MFP 100, the client PC 101, the cloud service server 102, and the cloud storage server 103, but this is only an example and the system configuration is not limited to this. For example, it may also be possible for the MFP 100 to have the role of the client PC 101 and the cloud service server 102. Further, the cloud service server 102 may be arranged on a server on the LAN in place of the internet. Furthermore, the cloud storage server 103 may be replaced with a mail server and in this case, it is sufficient to transmit the data of the scanned business form image to the mail server along with a storage request by attaching the data to an electronic mail.

<Hardware Configuration of MFP>

Figure 2:
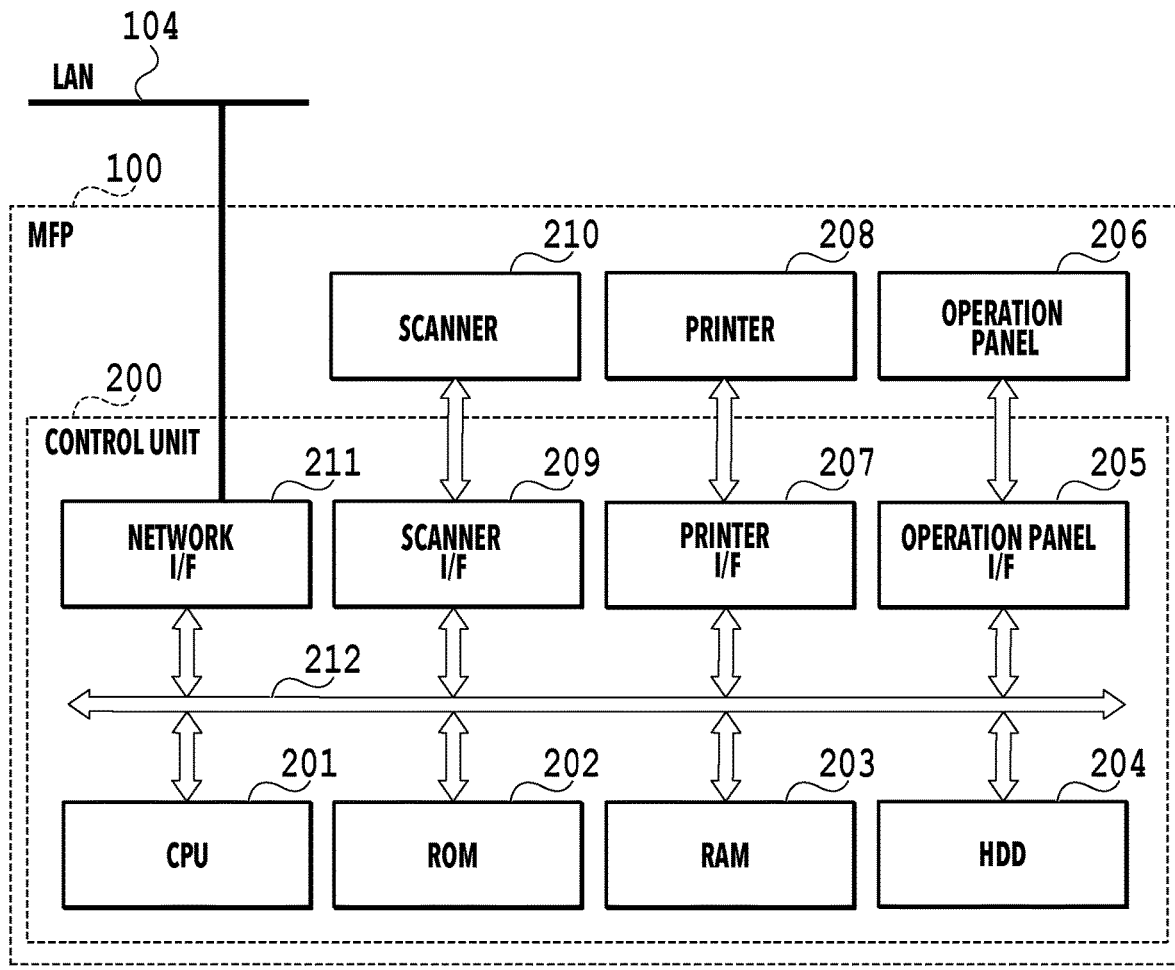
FIG. 2 is a diagram showing an example of a hardware configuration of an MFP.

FIG. 2 is a diagram showing an example of the hardware configuration of the MFP 100. The MFP 100 comprises a control unit 200 configured to control the operation of the entire MFP 100, an operation panel 206 on which a user performs various input operations, a printer 208 that performs print processing, and a scanner 210 that reads a document, such as a business form.

The control unit 200 has a CPU 201, a ROM 202, a RAM 203, an HDD 204, an operation panel I/F 205, a printer I/F 207, a scanner I/F 209, and a network I/F 211. Each element is connected via a system bus 212 so as to be able to communicate with one another. The CPU 201 functions as a unit configured to perform each piece of processing (reading control of business form, image processing and the like) by reading and executing control programs stored in a storage device. The storage device includes the ROM 202, which is a nonvolatile memory, the RAM 203, which is a volatile memory, the HDD 204, which is a large-capacity storage area, and the like. The ROM 202 is a nonvolatile memory that stores control programs and the like and the CPU 201 performs various kinds of control by reading and executing control programs and the like. The RAM 203 is a volatile memory that is used as a temporary storage area, such as a main memory and a work area, of the CPU 201. The HDD 204 is a nonvolatile memory that is used as a large-capacity storage area that stores image data and the like.

The operation panel I/F 205 connects the operation panel 206 and the control unit 200 via the system bus 212. On the operation panel 206, a liquid crystal display unit having a touch panel function, a hard button and the like are provided. The printer I/F 207 connects the printer 208 and the control unit 200 via the system bus 212. The printer 208 receives the image data generated by the CPU 201 via the printer I/F 207 and forms an image on a sheet (printing medium) by using the image data and outputs the sheet. The scanner I/F 209 connects the scanner 210 and the control unit 200 via the system bus 212. The scanner 210 generates a scanned image (business form image) by reading a business form placed on a document table or the like, not shown schematically, and inputs the data of the business form image to the control unit 200 via the scanner I/F 209. The network I/F 211 connects the control unit 200 (MFP 100) to the LAN 104 and transmits the data of the business form image and the like to an external device on the LAN 104, receives various kinds of information from an external device on the LAN 104, and so on.

<Hardware Configuration of Client PC>

Figure 3:
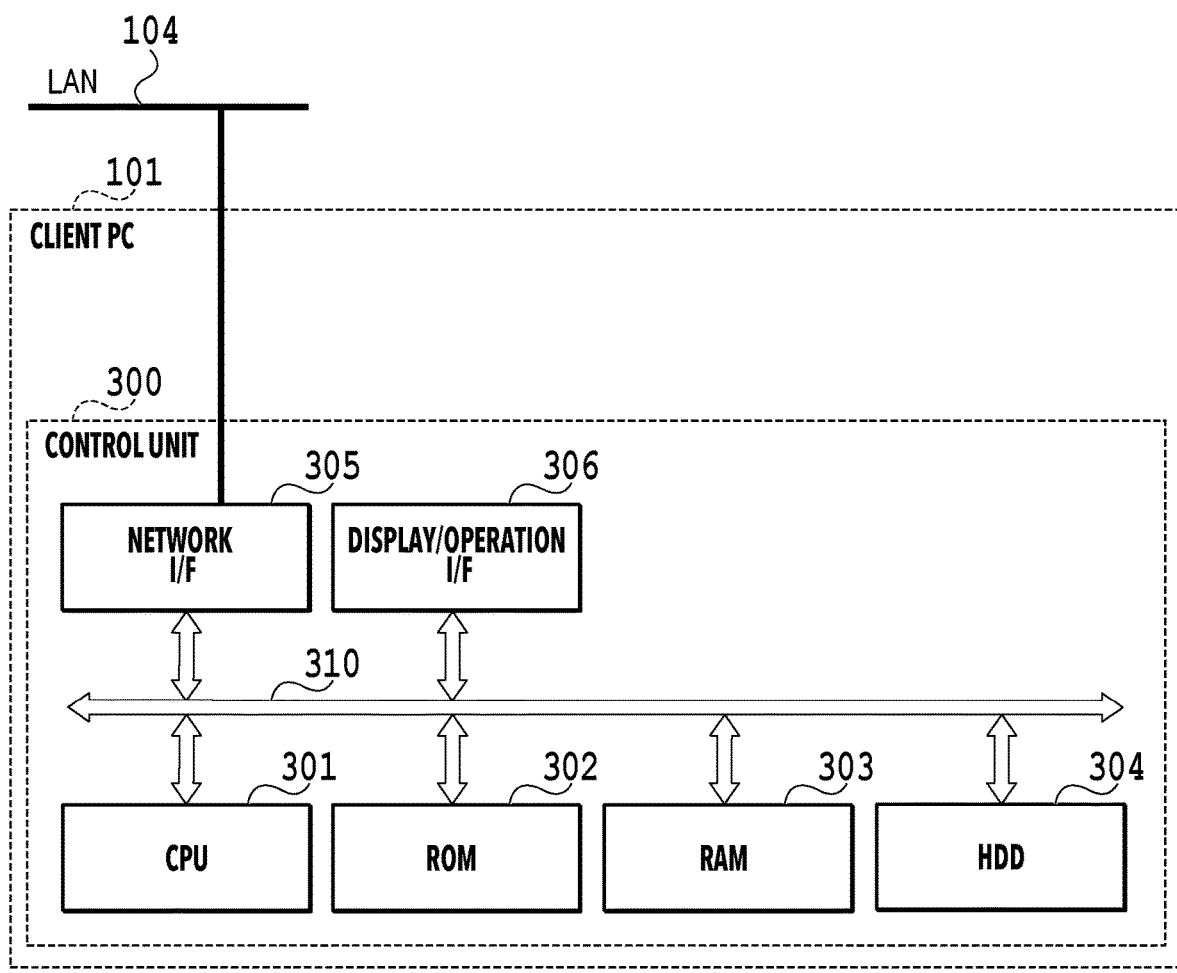
FIG. 3 is a diagram showing an example of a hardware configuration of a client PC.

FIG. 3 is a diagram showing an example of the hardware configuration of the client PC 101, which is an information processing apparatus. A control unit 300 including a CPU 301 controls the operation of the entire client PC 101. Among each element shown in FIG. 3, the CPU 301, a ROM 302, a RAM 303, an HDD 304, and a network I/F 305 are the same as each corresponding element of the MFP 100, and therefore, explanation is omitted. A display/operation I/F 306 connects an output device, such as a display device, and an input device, such as a keyboard and a mouse, and the control unit 300 via a system bus 310.

<Hardware Configuration of Cloud Service Server and Cloud Storage Server>

Figure 4:
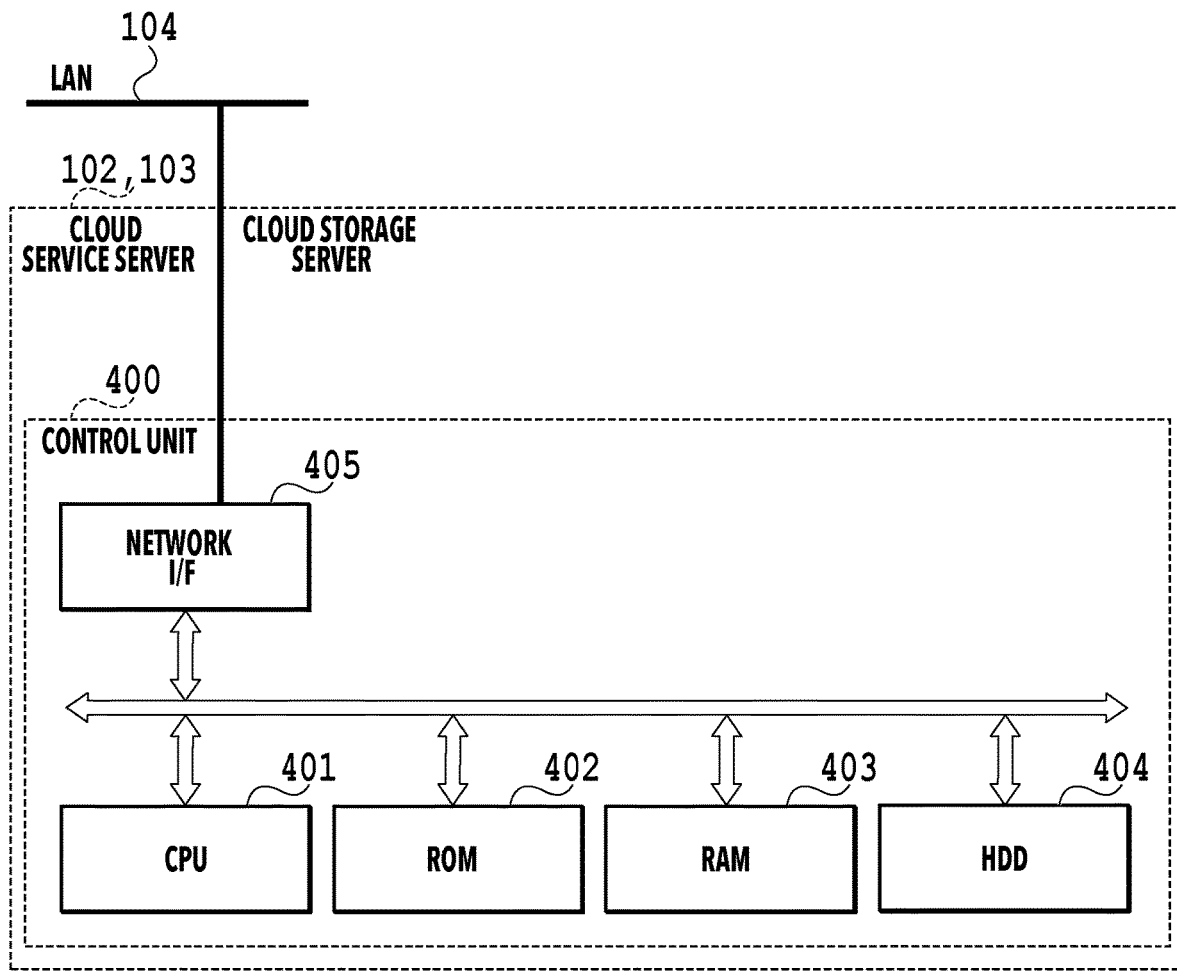
FIG. 4 is a diagram showing an example of a hardware configuration of a cloud service server and a cloud storage server.

FIG. 4 is a diagram showing an example of the hardware configuration of the cloud service server 102 and the cloud storage server 103, which are each an information processing apparatus. The configuration of the cloud service server 102 and the configuration of the cloud storage server 103 are basically the same except only in that the storage capacity and the like of an HDD 404 and the like are different. Each element shown in FIG. 4 is the same as each corresponding element of the client PC 101 shown in FIG. 3, and therefore, explanation is omitted.

<Software Configuration of Business Form Management System>

Figure 5:
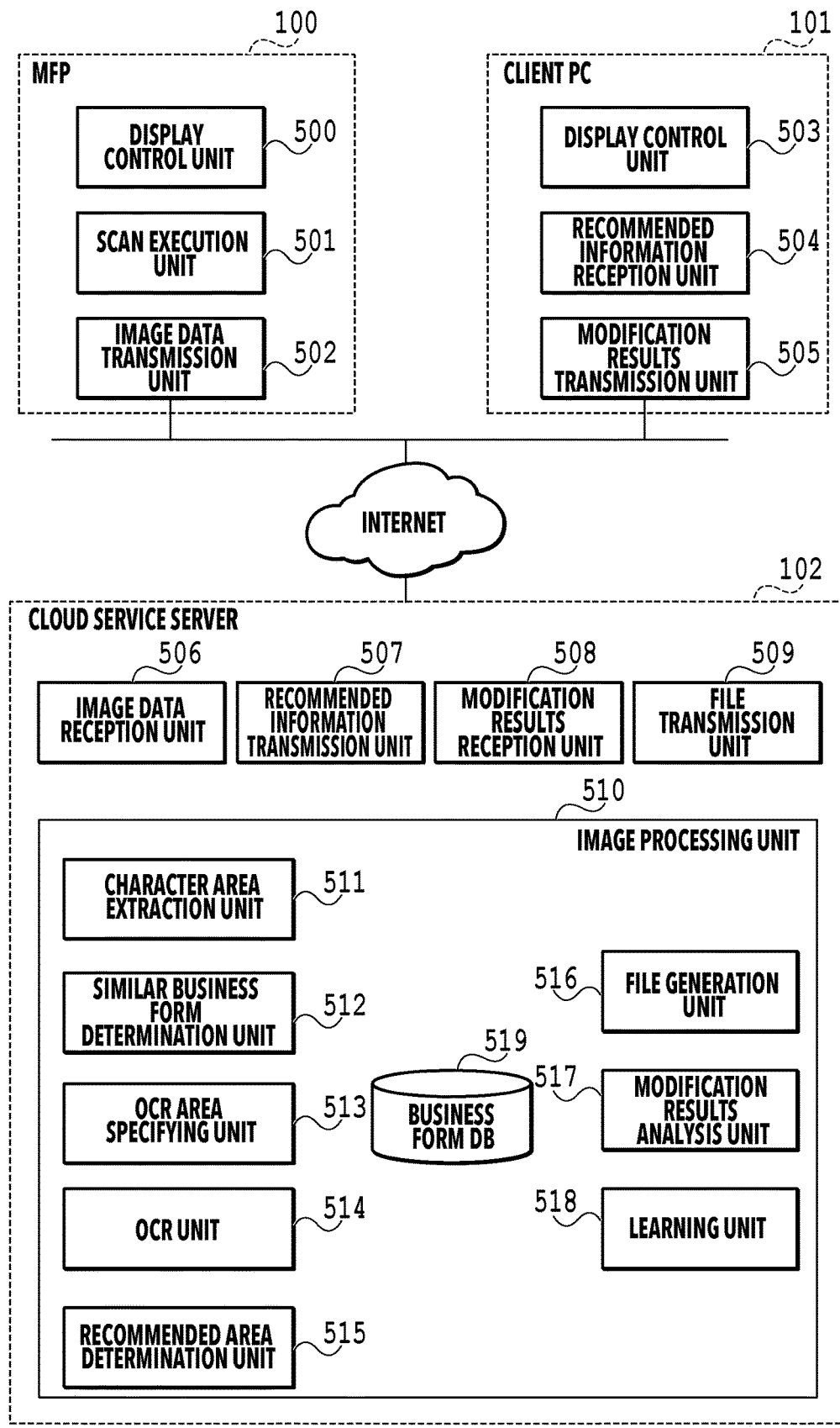
FIG. 5 is a block diagram showing a software configuration of an MFP, a client PC, and a cloud service server.

FIG. 5 is a block diagram showing the software configuration of the MFP 100, the client PC 101, and the cloud service server 102 respectively, which constitute the business form management system. Although the software configuration of the cloud storage server 103 is not shown schematically, the cloud storage server 103 has a general software configuration for implementing the storage function, such as transmission, reception, and storage of data. In the following, the software configuration of the MFP 100, the client PC 101, and the cloud service server 102 respectively, is explained.

<Software Configuration of MFP>>

The MFP 100 has a display control unit 500, a scan execution unit 501, and an image data transmission unit 502. The display control unit 500 performs control to display a user interface screen (in the following, described as "UI screen") for a user to perform various settings and give instructions on the operation panel 206 and receives the input operation of a user. The scan execution unit 501 obtains a business form image by scanning a business form or the like placed on a document table, not shown schematically, by controlling the scanner 210. The image data transmission unit 502 transmits the data of the business form image to the cloud service server 102 via the network I/F 211.

<<<Software Configuration of Cloud Service Server>>>

The cloud service server 102 has an image data reception unit 506, a recommended information transmission unit 507, a modification results reception unit 508, a file transmission unit 509, and an image processing unit 510. Further, the image processing unit 510 has a character area extraction unit 511, a similar business form determination unit 512, an OCR area specifying unit 513, an OCR unit 514, a recommended area determination unit 515, a file generation unit 516, a modification results analysis unit 517, and a learning unit 518. The image data reception unit 506 receives data of a business form image from the MFP 100 via a network I/F 405. The character area extraction unit 511 extracts an area (character area) corresponding to a character existing within the business form from the business form image received by the image data reception unit 506. The similar business form determination unit 512 specifies a business form similar to the business form (input business form) relating to the received business form image among the business form group registered in a business form DB (database) 519 based on the information (arrangement information) indicating the arrangement of the character area extracted by the character area extraction unit 511. By finding a business form whose character string arrangement is similar from the group of business forms electronized in the past, it is made possible to recommend a character string for property setting at the time of electronizing the input business form. The OCR area specifying unit 513 specifies an OCR application-target character area among the character areas within the input business form based on the similar business form specified by the similar business form determination unit 512. The OCR unit 514 obtains character recognition results for each character area by performing character recognition processing for the character area specified by the OCR area specifying unit 513. Here, in the character recognition results, text data (character code) of the recognized character string and information on the area corresponding to the character string obtained by dividing the recognized character string in predetermined units are included. In the following, the character string divided into which in predetermined units is called "unit character string" and the area corresponding to the unit character string is called "unit character string area". The recommended area determination unit 515 determines a specific area within the business form image for extracting a specific character string for property setting about the input business form from the character recognition results. Here, the specific character string is the character string corresponding to the specific item designated in advance and is the character string that is recommended to a user as the character string used for property setting. In the following, this specific character string is called "recommended character string". Further, the specific area within the business form image for extracting a recommended character string from character recognition results is called "recommended area". Details of the processing to determine a recommended area will be described later. The recommended information transmission unit 507 transmits information (in the following, called "recommended information") on a recommended character string and a recommended area to the client PC 101 via the network I/F 405. The modification results reception unit 508 receives the results (information indicating the modified character string) of modification performed by a user for the recommended character string in the client PC via the network I/F 405. The file generation unit 516 electronizes the business form image relating to the input business form. Specifically, the file generation unit 516 generates an image file for transmission to the cloud storage server 103 by attaching a file name and a folder path using the modified character string to the received business form image, and so on. The file transmission unit 509 transmits the image file generated by the file generation unit 516 to the cloud storage server 103 via the network I/F 405. The modification results analysis unit 517 analyzes the modification results received by the modification results reception unit 508. Specifically, in a case where it becomes clear that there is an excess or a lack of the recommended area in units of predetermined character string areas based on the modified character string, a recommended information that eliminates the excess or the lack is specified. The learning unit 518 learns the scanned images of the business form, the arrangement information on the character area, and the unit character string area information and registers the information (in the following, called "business form information") indicating the feature of the business form in the business form DB 519 for each business form type. Further, in a case where the recommended area that eliminates the excess or the lack is specified by the modification results analysis unit 517, the learning unit 518 learns the contents thereof and updates the business form information registered in the business form DB 519. Details of the business form information and the updating thereof will be described later.

<<<Software Configuration of Client PC>>>

The client PC 101 has a display control unit 503, a recommended information reception unit 504, and a modification results transmission unit 505. The display control unit 503 causes a UI screen for setting a property necessary at the time of electronizing an input business form to be displayed on a display, not shown schematically, via the display/operation I/F 306. For example, on a UI screen for setting a file name as a property, a character string that is taken as a candidate of a file name based on the above-described recommended information is displayed. Further, the display control unit 503 receives a user input from a mouse or a keyboard via the display/operation I/F 306. The recommended information reception unit 504 receives business form image data and recommended information from the cloud service server 102 via the network I/F 305. The modification results transmission unit 505 transmits the results of modification performed by a user for the recommended character string to the cloud service server 102 via the network I/F 305.

For example, it may also be possible for the MFP 100 having the function of the client PC 101 as well to have the recommended information reception unit 504 and the modification results transmission unit 505 of the client PC 101.

<Outline of Processing in Business Form Management System>

Figure 6:
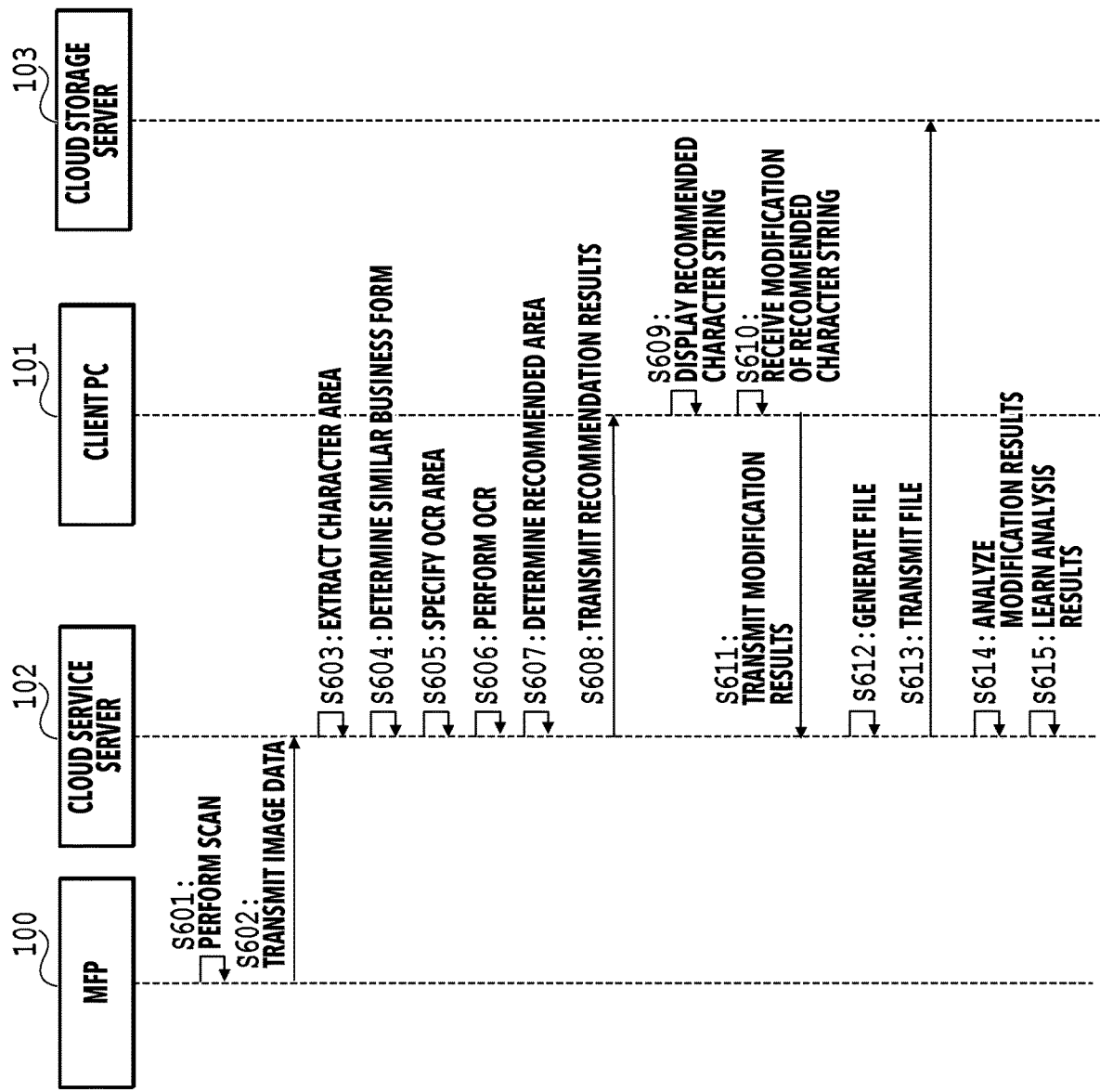
FIG. 6 is a sequence diagram showing a flow of processing between apparatuses from scanning and electronizing a business form until storing the file in a cloud storage server.

FIG. 6 is a sequence diagram showing a flow of processing among the apparatuses from scanning a business form in the MFP 100 and electronizing the obtained business form image in the cloud service server 102 until storing the file in the cloud storage server 103. In the following, along the sequence diagram in FIG. 6, operations performed among the apparatuses are explained in a time series. In the following explanation, symbol "S" means a step. In the sequence diagram in FIG. 6, the configuration is such that the client PC 101 performs operations with the cloud service server 102. However, the configuration may be one in which displaying of a recommended character string, modification of a recommended character string and the like, to be described later, are performed in the MFP 100, not the client PC 101.

<<Processing in MFP>>

First, by the MFP 100 scanning a processing-target business form, a business form image is generated (S601). Specifically, first, a user sets a processing-target business form on a document table or ADF (Auto Document Feeder) and gives instructions to perform a scan via the display control unit 500. In response to the scan instructions, the scanner 210 obtains a business form image by scanning the business form under the control of the scan execution unit 501. FIG. 7A shows an example of the business form image obtained by scanning an invoice, which is one kind of business form. Then, by the image data transmission unit 502, the data of the business form image as shown in FIG. 7A described above is transmitted to the cloud service server 102 (S602).

<<Processing in Cloud Service Server>>

In the cloud service server 102 having received the business form image data by the image data reception unit 506, image analysis processing (S603 to S607) for the received business form image is performed in the image processing unit 510. In the following, the contents of the image analysis processing are explained.

First, by the character area extraction unit 511, processing to extract a character area is performed for the received business form image (S603). The character area refers to the area determined to have the text attribute in the business form image. In order to extract a character area, the character area extraction unit 511 first performs block selection processing. The block selection processing is processing to, after separating the image into the foreground areas and the background areas, divide the foreground areas in accordance with the object attribute. In the block selection processing, first, the business form image is binarized into two values, that is, white and black, and by performing contour tracking for the obtained binary image, a pixel block surrounded by a black pixel contour is extracted. Then, for the black pixel block having a predetermined area or a larger area, the contour tracking is performed also for white pixels located inside thereof and a white pixel block is extracted and from the inside of a white pixel block whose area is larger than or equal to a predetermined area, a black pixel block is extracted recursively. The black pixel block thus obtained is determined to be the foreground area and the foreground areas are classified according to size and shape and classified into the area for each object attribute. For example. the pixel block whose aspect ratio is close to 1 and whose size is within a predetermined range is determined to be a pixel block corresponding to a character and further, the portion in which characters in close proximity to one another are aligned well and can be grouped is determined to be a character area (area of TEXT attribute). Then, the flat pixel block is determined to be a line area (area of LINE attribute). The range whose size is larger than or equal to a predetermined size and which is occupied by the black pixel block including well-aligned rectangular white pixel blocks is determined to be a table area (area of TABLE attribute). The area in which irregularly shaped pixel blocks are dispersed is determined to be a photo area (area of PHOTO attribute). Then, the pixel block whose shape is arbitrary other than those described above is determined to be a picture area (area of PICTURE attribute). Among the areas divided for each object attribute, the area determined to have the TEXT attribute is specified as the character area. FIG. 7B is a diagram showing an example of the results of applying the block selection processing to the business form image in FIG. 7A. Further, FIG. 7C is a diagram showing the state where only the character areas are extracted from the block selection results in FIG. 7B. The information (information indicating the object attribute and the position of each character area) on each character area obtained by the character area extraction is used for similar business form determination, OCR area specification and the like, to be described later. The reason only the character areas are extracted is that the position of the character area well represents the structure of the business form image and closely relates to scan assist information. Consequently, it is not intended to limit utilization of the information on the areas determined to have another object attribute, such as the photo area and the table area, for subsequent processing.

Next, by the similar business form determination unit 512, processing to specify a business form similar to the input business form relating to the received business form image from the business form group registered in the business form DB 519 is performed (S604). In the following, detailed explanation is given.

Figure 8:
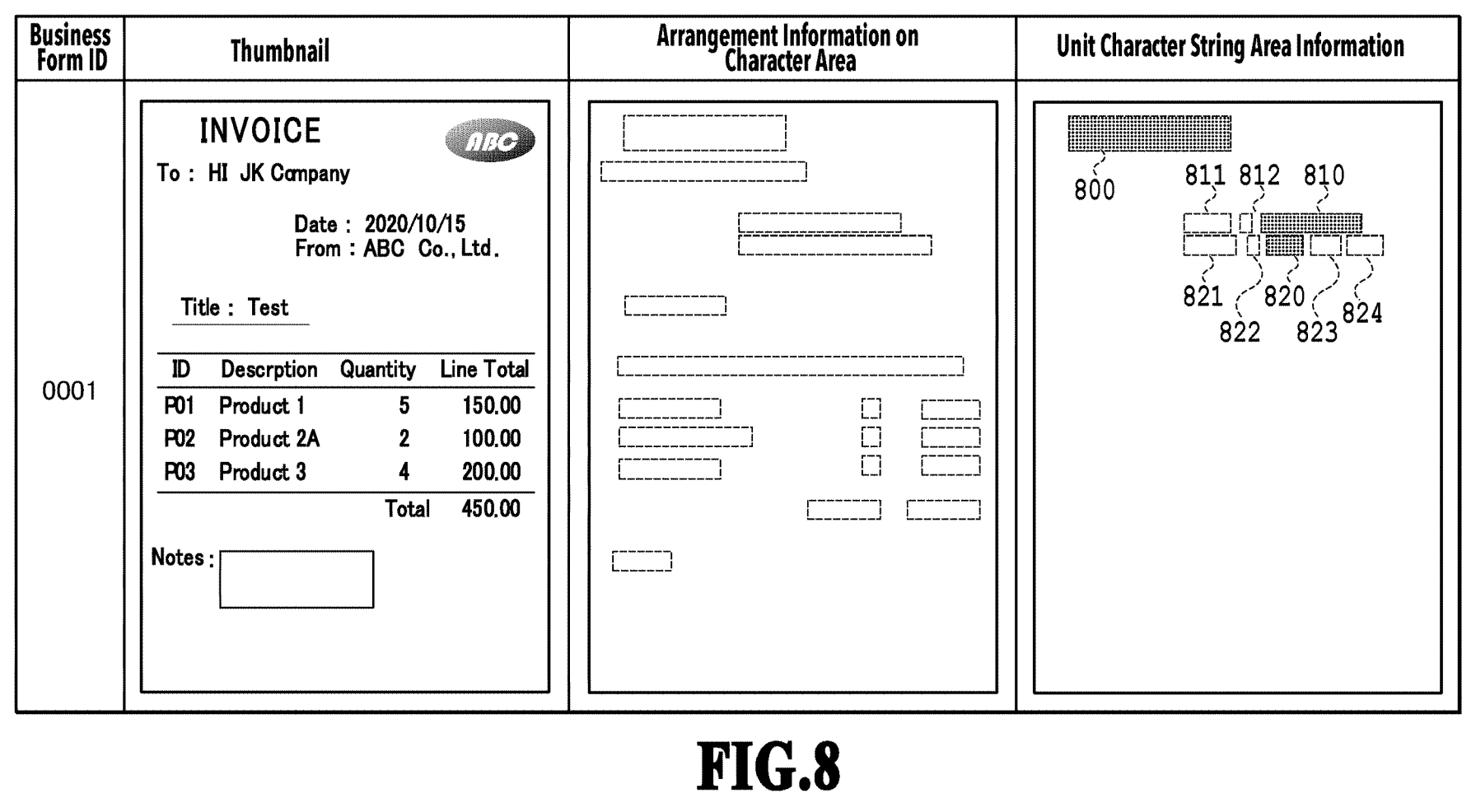

First, the business form information on the group of business forms electronized in the past, which is registered in the business form DB 519, is obtained. FIG. 8 is a diagram showing an example of the business form information registered in the business form DB 519. As shown in FIG. 8, the business form information includes a combination of a unique business form ID that is allocated to each business form type, a thumbnail image obtained by reducing the scanned image of the business form, arrangement information on character areas in the business form, and unit character string area information. As described above, the unit character string area is the area obtained by dividing the recognized character string in predetermined units, which is obtained by performing character recognition processing for the character area, and in the present embodiment, refers to the area divided for each word. For example, in a case where character recognition processing is performed for a character area 720 in FIG. 7C, as a recognized character string, "From: XX YY Co., Ltd." is obtained (see FIG. 7A). Then, the recognized character string is divided at the space as a separator and six unit character string areas 721 to 726 as shown in FIG. 7D are obtained. The separator of a unit character string area is not limited to a space. For example, in place of a space, it may also be possible to divide a unit character string area by a specific character, such as a colon and a comma, or it may also be possible to divide a unit character string area for each part of speech by using a morphemic analysis. The business form DB 519 stores the number of combinations of the business form ID, the thumbnail image, the arrangement information on character areas, and the unit character string area information, which is equal to the number of trained business form types. Then, in the unit character string area information, the coordinate information on the rectangle indicating the character string area (selected character string area) corresponding to a specific item, which a user selected in the past as the character string used as a file name, and coordinate information on the rectangle indicating the character string area (unselected character string area) on the periphery thereof, which was not selected by a user, are included. Here, the specific item is designated in advance by a user for each business form type. Then, it is assumed that in the above-described unit character string area information, information indicating which specific item each elected character string area corresponds to is also included.

The unit character string area information shown in FIG. 8 is an example of a case where a file name of "INVOICE_ABC_2020/10/15" is attached by using the character string corresponding to each item of the title, the company name, and the date described within the business form. In this case, three unit character string areas 800, 810, and 820 as a selected character string area for each item and six unit character string areas 811, 812, 821, 822, 823, and 824 as unselected character string area are learned and registered in association with the business form ID.

Then, based on the business form information for each business form type, which is obtained from the business form DB 519, and the arrangement information on the character area of the input business form, calculation of the degree of similarity is performed, which represents to which extent the shape and arrangement of the character area are similar between the input business form and each of the registered business form group in a one-to-one manner. In the calculation of the degree of similarity, first, position adjustment is performed between all the character areas of the input business form and all the character areas of the registered business form. Next, a value obtained by dividing the square of the sum total of the areas at which each character area of the input business form and each character area of the registered business form overlap by the product of the sum total of the character area areas of the input business form and the sum total of the character area areas of the registered business form is taken as the degree of similarity between both the business forms. The calculation of the degree of similarity such as this is performed between the input business form and each of all the registered business forms. Then, in a case where the highest degree of similarity among the calculated degrees of similarity is higher than or equal to a predetermined value, it is determined that the registered business form is similar to the input business form (the business form type is the same). In this manner, the registered business form similar to the input business form is determined.

Following the above, by the OCR area specifying unit 513, based on the results of similar business form determination processing, a character area for which the character recognition processing is performed is specified (S605). Specifically, the character area corresponding to the selected character string area registered in association with the similar registered input business form (in the following, described as "similar business form") specified at 604 is specified from among all the character areas existing within the input business form. For example, it is assumed that the input business form in FIG. 7A is determined to be similar to the registered business form whose business form ID shown in FIG. 8 is "0001". In this case, a character area 700 (see FIG. 7C) within the input business form, which corresponds to the selected character string area 800, is specified as the OCR application-target character area. Similarly, a character area 710 and the character area 720 within the input business form, which correspond to the selected character string areas 810 and 820 respectively, are also specified as the OCR application-target character areas.

Following the above, by the OCR unit 514, for the character area within the input business form, which is specified as the OCR application-target character area, the character recognition processing is performed. Due to this, the results (information on the recognized character string and unit character string area) of the character recognition performed for the character area are obtained. The character recognition results obtained by performing the character recognition processing for the character areas 700, 710, and 720 in FIG. 7C are shown in FIG. 7D described previously and Table 1 below is a table obtained by putting the results together.

TABLE 1

| Character area | Recognized character string | Unit character string area |
|---|---|---|
| 700 | INVOICE | 701 |
| 710 | Date | 711 |
|  | : | 712 |
|  | 2020 Nov. 17 | 713 |
|  | PM10 | 714 |
| 720 | From | 721 |
|  | : | 722 |
|  | XX | 723 |
|  | YY | 724 |
|  | CO., | 725 |
|  | Ltd. | 726 |

Next, by the recommended area determination unit 515, processing to determine a recommended area for extracting a recommended character string from the recognized character string is performed. For the processing to determine a recommended area, the business form information on the similar business form specified at S604 and the character recognition results obtained at S605 are used. Specifically, based on the width and position of the unit character string area and the interval between the unit character string areas, one or more unit character string areas within the input business form, which correspond to the selected character string areas, are determined as a recommended area for each item. At that time, the unit character string area within the input business form, which corresponds to the unselected unit character string area, is determined as an unrecommended area. Here, explanation is given by taking a case as an example where the recommended areas corresponding to the three selected character string areas 800, 810, and 820 shown in FIG. 8 are determined from among the unit character string areas within the input business form shown in FIG. 7D. First, for the selected character string areas 800 and 810, the unit character string areas 701 and 713 within the input business form, both the area width and the coordinate position of which are similar respectively, are determined as the recommended areas. Further, for the selected character string area 820, the unit character string area within the input business form, both the area width and the coordinate position of which are similar, does not exist. Consequently, first, the unit character string areas 721 to 726 within the input business form, which overlap the selected character string area 820 in the Y-axis direction, are extracted. Next, among these extracted unit character string areas, the unit character string areas 721, 722, 725, and 726 whose area width and interval between the unit character string areas are similar to those of the unselected character string areas 821, 822, 823, and 824, respectively, are determined to be the unrecommended areas. Then, among the extracted unit character string areas, the unit character string areas 723 and 724 that are not determined to be the unrecommended areas are determined to be the recommended areas.

In a case where the recommended area is determined, the recommended information transmission unit 507 transmits recommended information including the recommended area and the character string (recommended character string) corresponding thereto and the data of the business form image relating to the input business form to the client PC 101 (S608).

<<Processing in Client PC>>

Figure 9A:
FIG. 9A and FIG. 9B are each a diagram showing an example of a UI screen for setting a file name.
Figure 9B:

The recommended information and the image data of the input business form transmitted from the cloud service server 102 are received by the recommended information reception unit 504 of the client PC 101. Then, by the display control unit 503, a UI screen for setting a property necessary for electronizing the input business form, on which the recommended information is reflected, is displayed on the display device (S609). FIG. 9A is a diagram showing an example of a UI screen for setting a file name. In the preview area on the left side on the screen, a recommended area 900 corresponding to the item "Title", a recommended area 910 corresponding to the item "Company", and a recommended area 920 corresponding to the item "Date" are displayed. Further, in the setting area on the right side on the screen, recommended character strings 901, 911, and 921 corresponding thereto respectively are displayed. A user checks the recommended file name and presses down the OK button in a case where there is no problem, or performs modification by using a keyboard and the like in a case where there is a problem. Here, it is assumed that some modification is performed by the user. The user having completed the modification for the recommended file name presses down the OK button thereafter. The display control unit 503 having detected the modification for the recommended file name and the pressing down of the OK button following the modification obtains the modification results (modified character string) for the recommended character string (S610). FIG. 9B is a diagram showing the state of the UI screen after the user has modified the recommended character string on the UI screen in FIG. 9A. The recommended character string 921 "20207/11/17" corresponding to the item "Date" has changed to "2020/11/17 PM10" by adding "PM10" to "2020/11/7" in a modified character string 922. In a case where the modification is completed as described above, by the modification results transmission unit 505, the modification results for the recommended character string are transmitted to the cloud service server 102 (S611).

<<Processing in Cloud Service Server>>

In a case where the modification results reception unit 508 receives the modification results, in the cloud service server 102, the file generation unit 516 electronizes the business form image (S612). At the time of this electronizing, the file name using the modified character string is attached. Then, the generated image file is transmitted to the cloud storage server 103 by the file transmission unit 509 (S613). Further, by the modification results analysis unit 517, the modification results are analyzed and a recommended area that makes it possible to present a desired recommended character string is specified (S614). Then, by the learning unit 518 learning the analysis results, the business form information registered in the business form DB 519, in more detail, the information indicating the selected character string area included in the unit character string area information is updated (S615).

The above is a rough flow of the processing in the business form management system.

<<Analysis of Modification Results and Learning of Analysis Results>>

Figure 10:
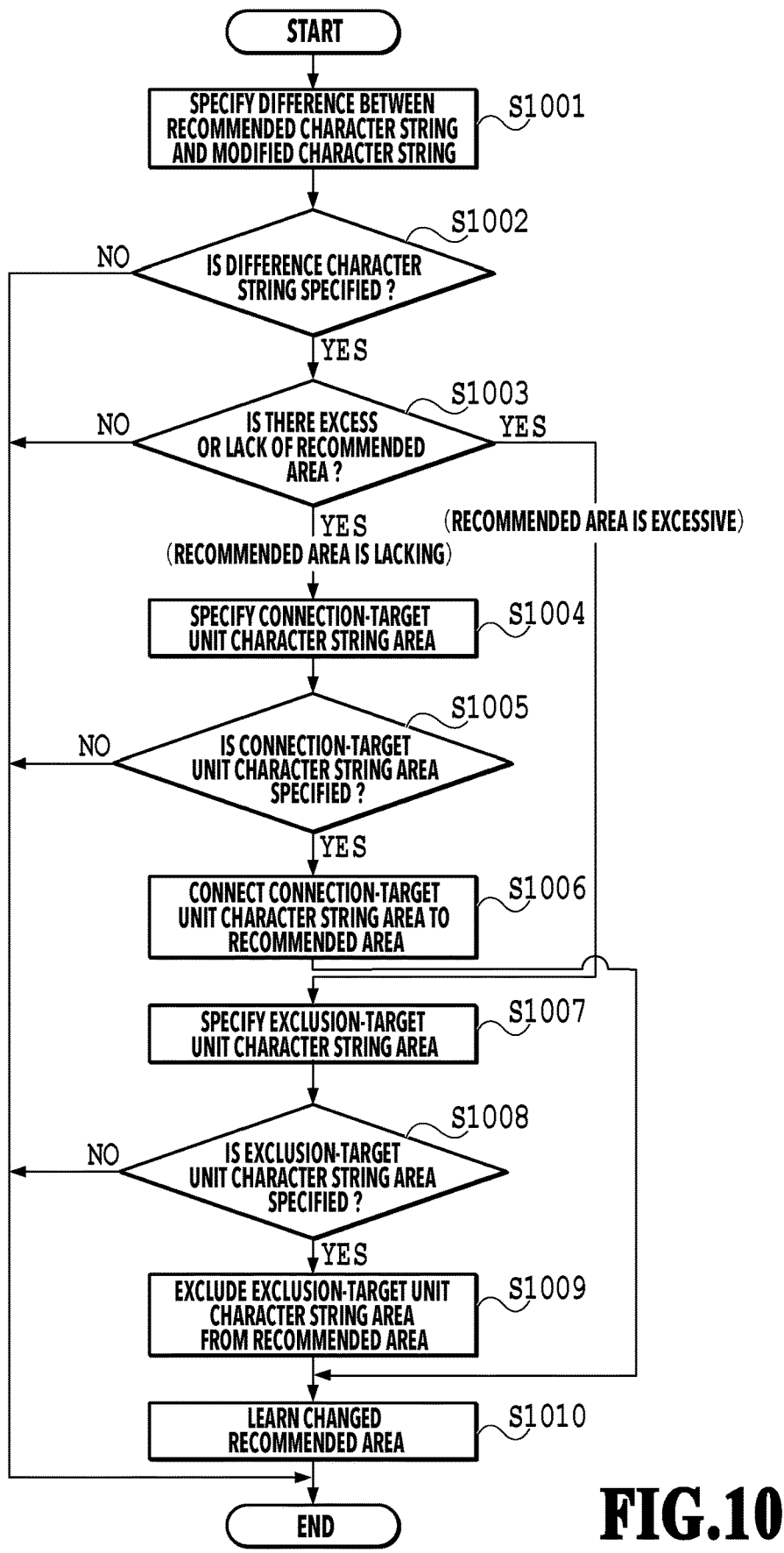
FIG. 10 is a flowchart showing a flow of processing from analyzing modification results until learning the results thereof according to a first embodiment.

Following the above, the analysis of the modification results and the learning based on the results thereof (corresponding to S614 and S615 in the sequence diagram in FIG. 6), which are performed by the cloud service server 102, are explained in detail. FIG. 10 is a flowchart showing a flow of processing from starting the analysis of the modification results until learning the results thereof. This flow is implemented by the CPU 401 loading a control program stored in the ROM 402 onto the RAM 403 and executing the control program. In the following explanation, symbol "S" means a step. Further, S1001 to S1011 are performed by the modification results analysis unit 517 and S1012 is performed by the learning unit 518.

At S1001, a difference between the recommended character string and the modified character string is specified based on the recommended information transmitted to the client PC 101 and the modification results received from the client PC 101. Specifically, first, whether the recommended character string includes the modified character string is determined. In a case where the recommended character string includes the modified character string, the portion that remains after removing the modified character string from the recommended character string is specified as the difference character string. For example, in a case where the recommended character string is "ABC Co., Ltd." and the modified character string is "ABC", "Co., Ltd." is specified as the difference character string. In a case where a space exists at the top or the end of the specified difference character string, the space is removed. In a case where the recommended character string does not include the modified character string, whether the modified character string includes the recommended character string is determined. In a case where the modified character string includes the recommended character string, the portion that remains after removing the recommended character string from the modified character string is specified as the difference character string. For example, in a case where the recommended character string is "2020/11/17" and the modified character string is "2020/11/17 PM10", "PM10" is specified as the difference character string. In a case where the recommended character string does not include the modified character string and the modified character string does not include the recommended character string (that is, the character string common to both the character strings does not exist), the modification results is not specified. For example, in a case where the recommended character string is written in English but the modified character string is written in a language different from English (for example, Japanese), the difference character string is not specified.

At S1002, the processing is branched in accordance with whether a difference character string is specified at S1001. In a case where the difference character string is specified, the processing advances to S1003 and in a case where the difference character string is not specified, this processing is terminated. For example, in a case where the recommended character string and the modified character string are the same, the difference character string is not specified, and therefore, this processing is terminated. In this case, no modified area exists, and therefore, updating of the business form information by the learning of the modified area is not performed. In a case where the recommended character string and the modified character string are different, some difference character string is specified, and therefore, the processing advances to S1003.

At S1003, whether or not a lack or an excess occurs in the recommended area is determined and the processing is branched in accordance with the determination results. Specifically, in a case where the modified character string includes the recommended character string, it is determined that the recommended area is lacking and the processing advances to S1004. On the other hand, in a case where the recommended character string includes the modified character string, it is determined that the recommended area is excessive and the processing advances to S1007. In a case where the determination results indicate neither lack nor excess of the recommended area occurs, this processing is terminated. The case where the difference character string is specified but neither lack nor excess occurs is, for example, a case where the recommended character string is "2020/11/17" and the modified character string is "11/17 PM10".

At S1004, based on the difference character string specified at S1001 and the character recognition results by the character recognition processing (S606), the unit character string area that is connected to the recommended area is specified. The connection-target unit character string area is specified by searching the periphery of the recommended area. Here, with reference to specific examples in FIG. 11A to FIG. 11D, processing to search for the connection-target unit character string area from the periphery of the recommended area is explained. In FIG. 11A to FIG. 11D, broken-line frames 1100 to 1103, 1110 to 1114, 1120 to 1125, and 1130 to 1135 indicate unit character string areas and among them, hatched frames indicate recommended areas.

Figure 11A:
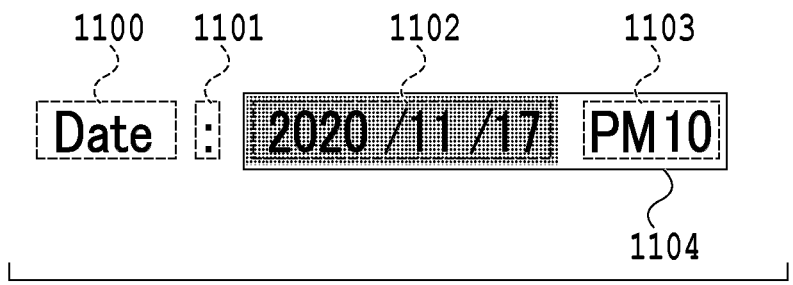
FIG. 11A to FIG. 11D are explanatory diagrams of processing to search for a connection-target unit character string area from the periphery of a recommended area.

FIG. 11A is a case where the recommended character string is "2020/11/17" and the modified character string is "2020/11/17 PM10". In this case, from the difference between both the character strings, it is determined that the unit character string area corresponding to the character string "PM10" is lacking. Then, the periphery of the recommended area 1102 is searched and the unit character string area 1103 corresponding to the character string "PM10" is specified as the connection-target area.

Figure 11B:
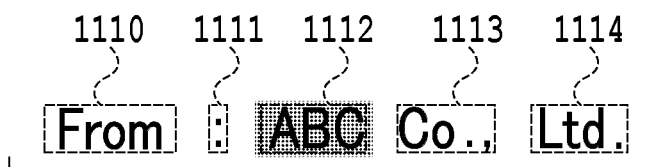

FIG. 11B is a case where the recommended character string is "ABC" and the modified character string is "ABC Co., Ltd.". In this case, from the difference between both the character strings, it is determined that the unit character string area corresponding to the character string "Co., Ltd." is lacking. Then, the periphery of the recommended area 1112 is searched and the unit character string area 1113 corresponding to the character string "Co.," and the unit character string area 1114 corresponding to the character string "Ltd." are specified as the connection-target areas.

Figure 11C:
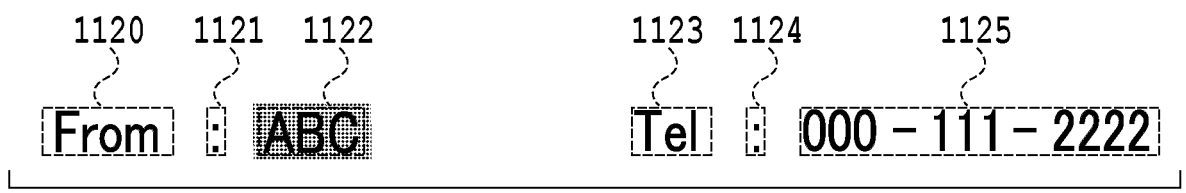

FIG. 11C is a case where the recommended character string is "ABC" and the modified character string is "ABC Co., Ltd.". In this case, from the difference between both the character strings, it is determined that the unit character string area corresponding to the character string "Co., Ltd." is lacking. Then, the periphery of the recommended area 1122 is searched but the unit character string area corresponding to the character string "Co., Ltd." does not exist, and therefore, the connection-target area is not specified.

Figure 11D:

FIG. 11D is a case where the recommended character string is "Mar" and the modified character string is "March". In this case, from the difference between both the character strings, it is determined that the unit character string area corresponding to the character string "ch" is lacking. Then, the periphery of the recommended area 1132 is searched.

Here, the character string "channel" of the unit character string area 1133 includes the difference character string "ch" but does not match, and therefore, the connection-target area is not specified.

The processing as above is performed at this step. Explanation is returned to the flow in FIG. 10.

At S1005, the processing is branched in accordance with whether a connection-target unit character string area is specified at S1004. In a case where the connection-target unit character string area is specified, the processing advances to S1006 and in a case where the connection-target unit character string area is not specified, this processing is terminated.

At S1006, the connection-target unit character string area specified at S1004 is connected to the recommended area for which it is determined that the area is lacking at S1003. Explanation is given by taking a case as an example where the commended character string is "2020/11/17" and the modified character string is "2020/11/17 PM10" in FIG. 11A described above. Here, as the connection-target area, the unit character string area 1103 is specified. Consequently, to the unit character string area 1102 as the recommended area for which it is determined that the area is lacking, the unit character string area 1103 is connected and as indicated by a solid-line frame 1104, a recommended area whose area is extended is obtained. By learning the recommended area (in the following, called "modified area") in which the modification results are reflected, which is obtained as described above, next time and later, it is made possible to present a recommended character string whose contents are the same as those of the modified character string for the input business form of the same type.

Figure 12A:
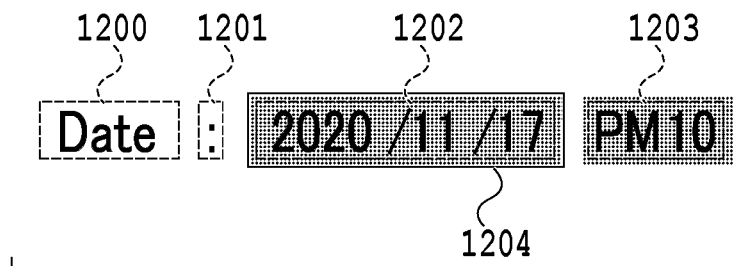
FIG. 12A to FIG. 12C are explanatory diagrams of processing to extract a unit character string area that is excluded from a recommended area.
Figure 12B:
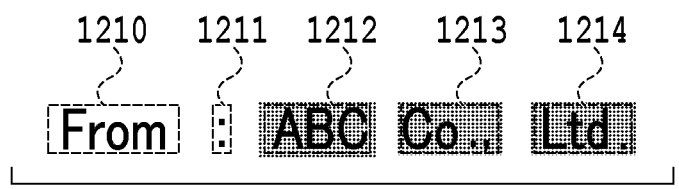
Figure 12C:
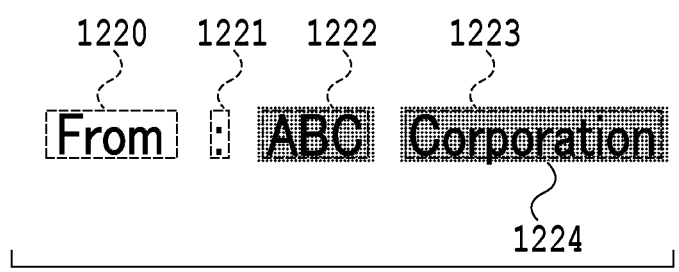

At S1007, based on the difference character string specified at S1001 and the character recognition results by the character recognition processing (S606), the unit character string area that is excluded from the recommended area is specified. Here, with reference to specific examples in FIG. 12A to FIG. 12C, processing to extract a unit character string area that is excluded from the recommended area is explained. In FIG. 12A to FIG. 12C, broken-line frames 1200 to 1203, 1210 to 1214, and 1220 to 1223 indicate unit character string areas and hatched portions indicate recommended areas.

FIG. 12A is a case where the recommended character string is "2020/11/17 PM10" and the modified character string is "2020/11/17". In this case, from the difference between both the character strings, the unit character string area of "PM10" is determined to be excessive. Consequently, the unit character string area 1203 corresponding to the character string "PM10" is specified as the exclusion-target area.

FIG. 12B is a case where the recommended character string is "ABC CO., Ltd." and the modified character string is "ABC". In this case, from the difference between both the character strings, the character string area of "CO. Ltd." is determined to be excessive. Consequently, the unit character string area 1213 corresponding to the character string "Co.," and the unit character string area 1214 corresponding to the character string "Ltd." are specified as the exclusion-target areas.

FIG. 12C is a case where the recommended character string is "ABC Corporation" and the modified character string is "ABC Corp". In this case, from the difference between both the character strings, the character string area of "oration" is determined to be excessive. Then, the character string "Corporation" of the unit character string area 1223 includes the character string "oration" but does not match, and therefore, the exclusion-target area is not specified.

The processing as above is performed at this step. Explanation is returned to the flow in FIG. 10.

At S1008, the processing is branched in accordance with whether an exclusion-target unit character string area is specified at S1007. In a case where the exclusion-target unit character string area is specified, the processing advances to S1009 and in a case where the exclusion-target unit character string area is not specified, this processing is terminated.

At S1009, the exclusion-target unit character string area specified at S1007 is excluded from the recommended area for which it is determined that the area is excessive at S1003. Explanation is given by taking a case as an example where the recommended character string is "2020/11/17 PM10" and the modified character string is "2020/11/17" in FIG. 12A described above. Here, as the exclusion-target area, the unit character string area 1203 is specified. Consequently, from the integrated area of the unit character string areas 1202 and 1203 as the recommended areas for which it is determined that the area is excessive, the unit character string area 1203 is excluded and the area indicated by a solid-line frame 1204 (that is, the unit character string area 1202) is obtained as the modified area. By learning the modified area thus obtained, it is made possible to present a recommended character string whose contents are the same as those of the modified character string for the input business form of the same type next time and later.

Figure 13B:

Then, at S1010, the modified area obtained at S1006 or S1009 is learned and the unit character string area information included in the business form information on the similar business form specified at S604, which is registered within the business form DB 519, is updated. Here, FIG. 13A is an example of the business form information before updating and FIG. 13B is an example of the business form information after updating. Here, it is assumed that a user modifies the recommended character string "2020/11/17" corresponding to the item "Date" to the modified character string "2020/11/17 PM10" in the example shown in FIG. 9A described previously. In this case, unit character string areas 1310 and 1313 are learned anew as selected character string areas (previously, only the unit character string area 1310) and unit character string areas 1311 and 1312 are learned as unselected character string areas. As a result of that, the unit character string area information in the business form information of the business form ID "0001" is updated from the contents shown in FIG. 13A to the contents shown in FIG. 13B. It may also be possible to perform updating of the business form information for only the unit character string area information relating to the item for which modification of the recommended character string has been performed, or perform updating also including the unit character string area information relating to the items for which modification of the recommended character string has not been performed. Further, it may also be possible to perform learning of the arrangement information on the character area, in addition to the learning of the unit character string area information.

The above is the contents of the learning processing based on the analysis of the modification results and the results thereof according to the present embodiment.

As above, according to the present embodiment, in a case where the character string that is recommended for setting of a property at the time of electronizing an input business form is modified by a user, based on the modification results, desirable recommended contents are analyzed and the results thereof are learned and the business form information registered in the database is updated. Due to this, in a case where the business form image of the same type is taken as the processing target next time and later, it is made possible to present a recommended character string reflecting the modified contents. As a result of that, it is no longer necessary for a user to perform the same work repeatedly, and therefore, usability improves.

Modification Example 1

In the embodiment described above, in a case where it is determined that the recommended area is lacking, the unit character string area that can be connected existing on the periphery of the recommended area is specified based on the difference character string and the character recognition results. However, in a case where the character recognition processing is not performed for the character areas on the periphery of the recommended area and the character recognition results do not exist, it is not possible to specify the connection-target unit character string area. Further, in such a case, on a condition that the character recognition processing is performed for all the character areas within the input business form, the processing efficiency is reduced considerably. Consequently, an aspect is explained as a modification example 1 in which in a case where it is not possible to specify the connection-target unit character string area (NO at S1005), the character recognition processing is performed only for the character areas on the periphery of the recommended area, for which OCR has not been performed, and the connection-target area is searched for by using the character recognition results.

Figure 14:
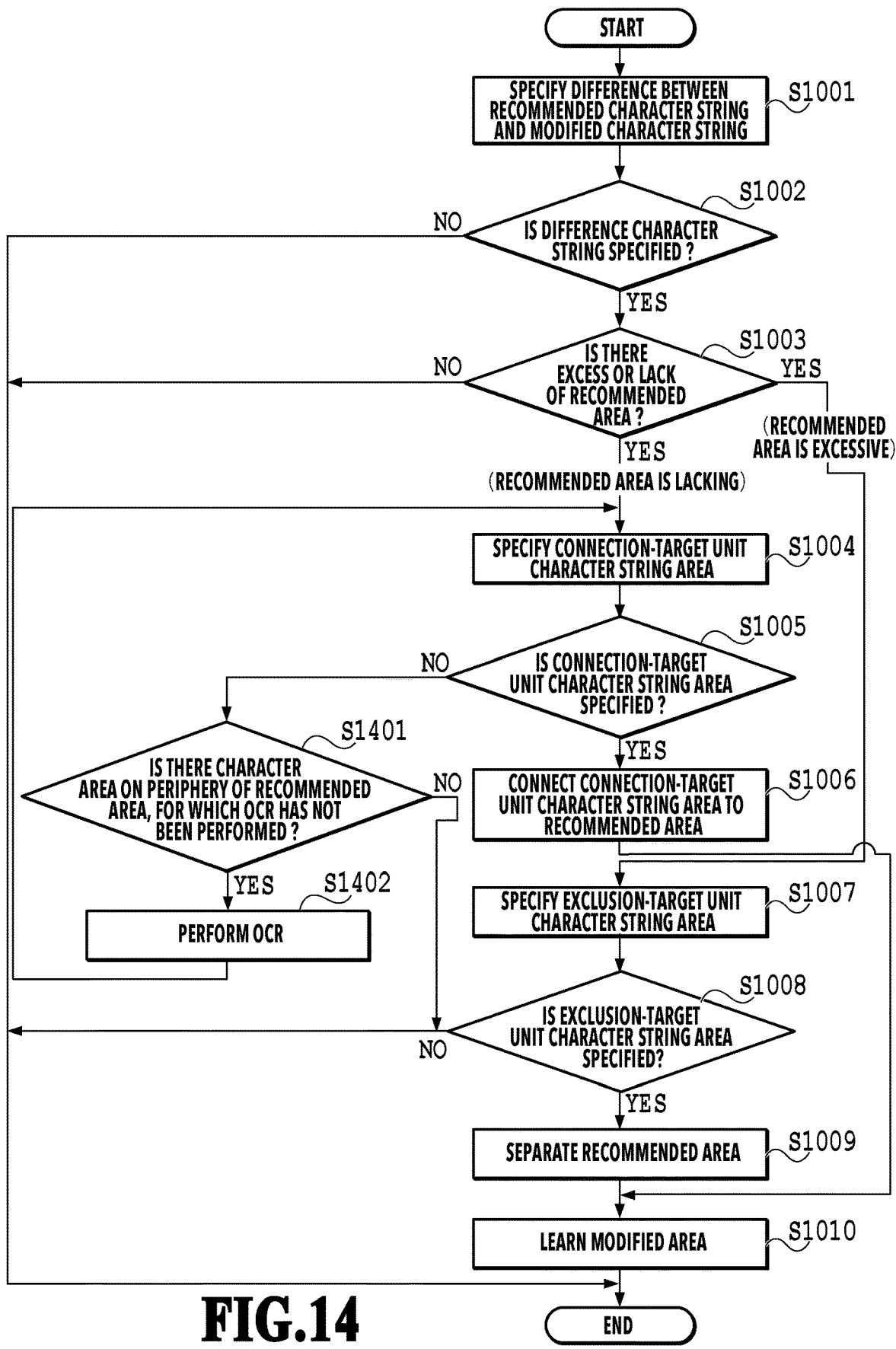
FIG. 14 is a flowchart showing a flow of processing from analyzing modification results until learning the results thereof according to a modification example 1.

FIG. 14 is a flowchart showing a flow of processing from starting the analysis of modification results until learning the results thereof. In the flow in FIGS. 14, S1401 and S1402 are added to the flow in FIG. 10. In the following, differences from the flow in FIG. 10 are explained.

In a case where the connection-target unit character string area is not specified (NO at S1005), the processing advances to S1401 without terminating the processing. Then, at S1401, the modification results analysis unit 517 determines whether there exists a character area for which the character recognition processing has not been performed on the periphery of the recommended area. Then, in a case where a character area for which the character recognition processing has not been performed exists on the periphery of the recommended area, the processing advances to S1402 and in a case where such a character area does not exist, this processing is terminated.

At S1402, the OCR unit 514 performs the character recognition processing for the character area existing on the periphery of the recommended area, for which OCR has not been performed, and obtains the character recognition results (character string and character string area). After OCR is completed, the processing returns to S1004 and by using the character recognition results obtained at S1402, the processing to specify the connection-target unit character string area is performed.

Figure 15:
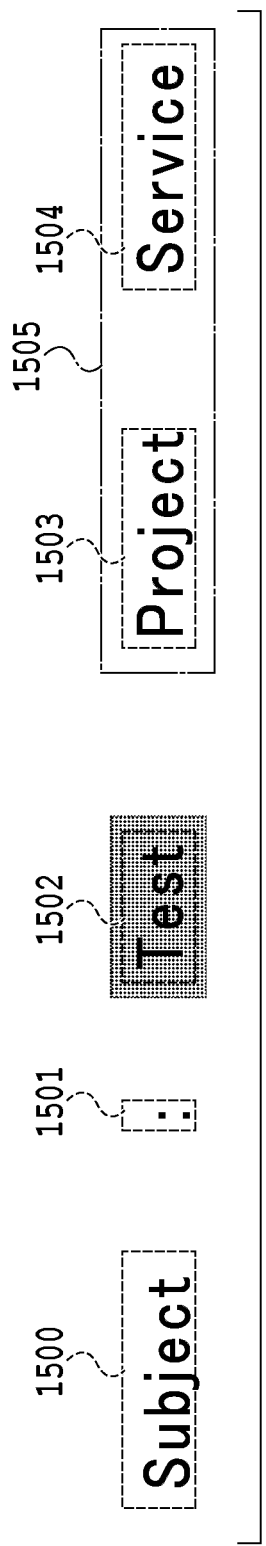
FIG. 15 is a diagram explaining an application example of the modification example 1.

The above is the difference from the flow in FIG. 10. In the following, an application example of the present modification example is explained. In FIG. 15, broken-line frames 1500 to 1504 indicate unit character string areas and among them, the hatched frame 1502 indicates the recommended area. However, at the point in time of the start of the flow in FIG. 14, the unit character string areas indicated by the broken-line frames 1503 and 1504 do not exist. A one-dot chain-line frame 1505 indicates character areas for which OCR has not performed at the point in time of the start of the flow in FIG. 14. Here, it is assumed that the recommended character string is "Test" and the modified character string is "Test Project". In this case, from the difference between both the character strings, it is determined that the unit character string area corresponding to the character string "Project" is lacking. Then, from the periphery of the recommended area 1502, the unit character string area corresponding to the character string "Project" is searched for, but the unit character string area 1503 does not exist at the this point in time, and therefore, the unit character string area corresponding to the character string "Project" is not specified. Consequently, the character recognition processing is performed for the character area 1505 adjacent to the recommended area 1502 and as the character recognition results, recognized character strings of "Project" and "Service" and the unit character string areas 1503 and 1504 of each of the recognized character strings are obtained. Then, at S1005, the periphery of the recommended area 1502 is searched anew and the unit character string area 1503 corresponding to the character string of "Project" is specified as the connection-target area.

As above, according to the present modification example, in a case where the character recognition processing has not been performed for the character area on the periphery of the recommended area, the character recognition processing is performed for the character area. By limiting the application range for which the character recognition processing is performed additionally as described above, it is possible to specify the connection-target unit character string area efficiently compared to a case where the character recognition processing is performed for all the character areas within the input business form.

Modification Example 2

In the embodiment described above, in a case where it is determined that the recommended area is excessive, the area that is excluded from the recommended area is specified by taking the unit character string area as the minimum unit based on the difference character string and the character recognition results. However, in a case where the difference character string is smaller than the unit character string area obtained by OCR (that is, in a case where the difference character string includes a partial character string obtained by dividing a unit character string area), it is not possible to specify the exclusion-target area. In this case, the modified area is not obtained, and therefore, learning is not performed and updating of the business form information is not performed. As a result of that, in a case where the business form image of the same type is input next time, the erroneous operation to present a recommended character string that a user does not desire is repeated. Consequently, an aspect is explained as a modification example 2 in which in a case where it is not possible to specify the unit character string area that is excluded from the recommended character string (NO at S1008), first, whether the recommended character string includes the modified character string is determined and then in a case where the recommended character string includes the modified character string, information that associates the recommended character string and the modified character string is learned.

Figure 16:
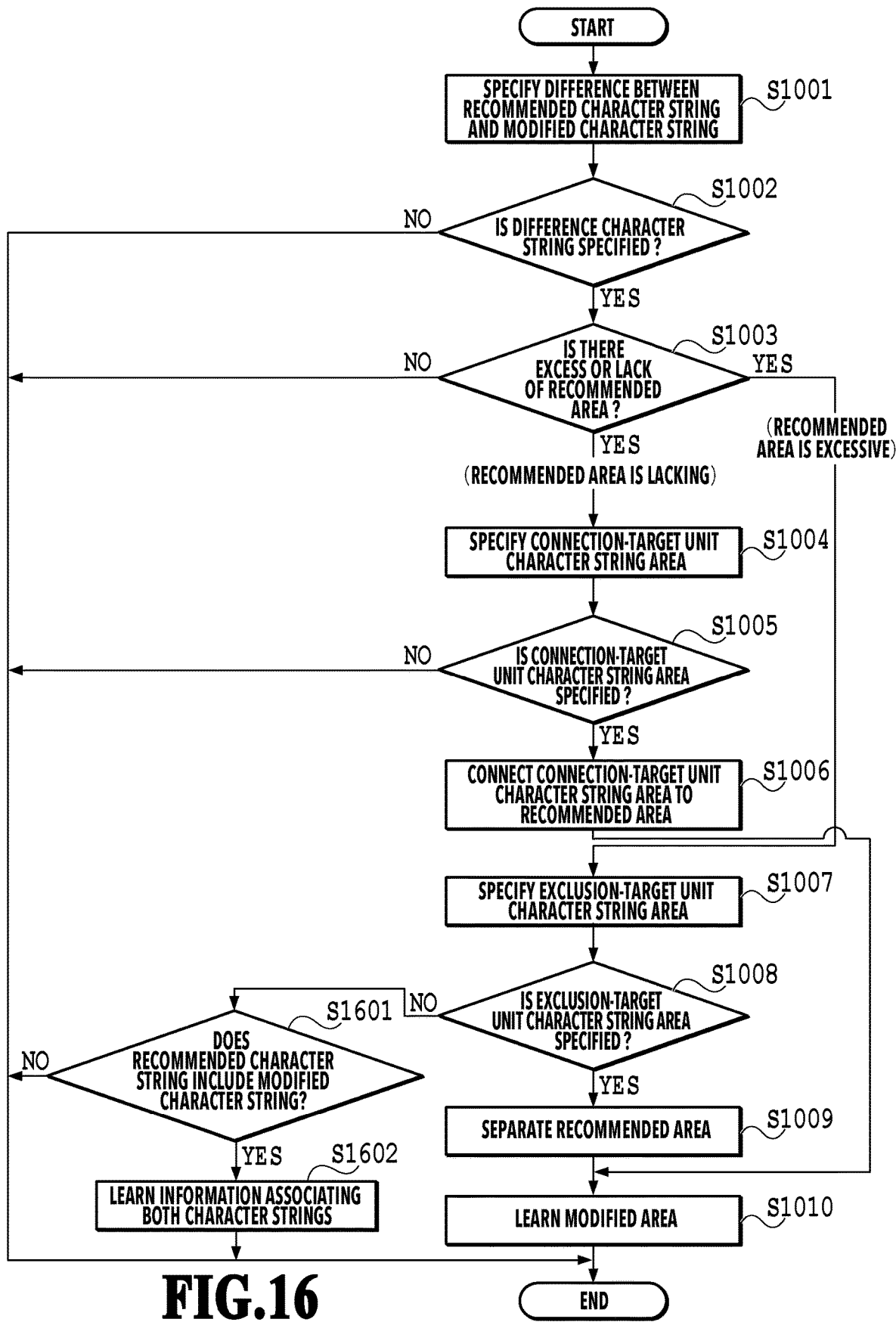
FIG. 16 is a flowchart showing a flow of processing from analyzing modification results until learning the results thereof according to a modification example 2.

FIG. 16 is a flowchart showing a flow of processing from starting the analysis of modification results until learning the results thereof. In the flow in FIGS. 16, S1601 and S1602 are added to the flow in FIG. 10. In the following, differences from the flow in FIG. 10 are explained.

In a case where the exclusion-target unit character string area is not specified (NO at S1008), the processing advances to S1601 without terminating the processing. Then, at S1601, the modification results analysis unit 517 determines whether the recommended character string includes the modified character string. Then, in a case where the recommended character string includes the modified character string, the processing advances to S1602 and in a case where the recommended character string does not include the modified character string, this processing is terminated.

At S1602, the modification results analysis unit 517 learns the information (in the following, called "pair information") that associates the recommended character string and the modified character string and additionally adds the pair information to the business form information on the similar business form specified at S604, which is registered in the business form DB 519. After the learning, this processing is terminated.

The above is the difference from the flow in FIG. 10. In the following an application example of the present modification example is explained. It is assumed that the recommended character string is "ABC Corporation" and the modified character string is "ABC Corp" in FIG. 12C described previously. In this case, from the difference between both the character strings, it is determined that the character string area corresponding to the portion of "oration" is excessive. Then, the character string "Corporation" of the character string area 1223 includes "oration" but does not match with the difference character string "oration" in units of character string areas. Consequently, the exclusion-target area is not specified at S107 (NO at S1008) but the determination results are YES at S1601, and therefore, the processing advances to S1602. Then, the pair information that associates the recommended character string "ABC Corporation" and the modified character string "ABC Corp" is generated and learned at S1602. Due to this, in a case where the business form image of the same type is input next time, by replacing the character string "ABC Corporation" with the character string "ABC Corp" and recommending the character string "ABC Corp", the recommended character string desired by the user is presented.

As above, according to the present modification example, in a case where it is not possible to specify the exclusion-target area, whether the recommended character string includes the modified character string is determined. Then, in a case where the recommended character string includes the modified character string, the pair information that associates the recommended character string and the modified character string is generated and learned. Due to this, the recommended character string is modified in units of character strings smaller than the unit character string area, and therefore, in a case where the business form image of the same type is input next time and later, it is possible to recommend the character string desired by the user.

Modification Example 3

Figure 17:
FIG. 17 is a diagram showing an example of a UI screen according to a modification example 3.

In the first embodiment described above, in a case where a user modifies the recommended character string, the modified area is specified from the difference between the recommended character string and the modified character string and the modified area is learned automatically, but it may also be possible to learn the modified area upon receipt of learning instructions from a user. In this case, it is sufficient to display the specified modified area and a button for a user to give instructions to learn the modified area on the UI screen, and so on. For example, in a case where the modification such as that illustrated in FIG. 9B is performed on the UI screen by a user, it is sufficient to cause the UI screen to make a transition into a UI screen in the state as shown in FIG. 17. Here, a modified area 1710 corresponding to the item "Date" is displayed within the preview area on the left side on the screen. It may be possible for a user to press down a "Yes" button 1701 in a case where the user desires to cause the specified modified area to be learned after checking the specified modified area, or press down a "No" button 1702 in a case where the user does not desire to cause the specified modified area to be learned. Upon receipt of explicit instructions to perform learning from a user, the client PC 101 makes a request to learn the modified area to the cloud service server 102.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, the complicatedness of the user operation at the time of modifying the recommended character string is eliminated and usability improves.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-076110, filed Apr. 28, 2021 which is hereby incorporated by reference wherein in its entirety.

What is claimed is:

1. An information processing apparatus for recommending, based on results of character recognition for a character area within a business form image, a specific character string to be used for setting a property of the business form image, the apparatus comprising:

one or more memories storing instructions; and
one or more processors executing the instructions to:
specify a business form similar to an inputted business form image based on feature information indicating a feature of a specified business form registered in a database, wherein the database registers the feature information about the specified similar business form and area information about the specified similar business form in association with each other, the area information indicating a position of a character string area including a character string to be used for setting a property;
determine a recommended area in the inputted business form image based on the area information about the specified similar business form associated with the feature information about the specified similar business form;
output a character string included in the determined recommended area for setting a property of the input business form image;
analyze a modified character string into which the outputted character string is modified by a user; and
update the database, which registers the area information about the specified similar business form, based on results of the analysis,
wherein in the analyzing,
a difference character string between the output character string and the modified character string is obtained, and
in a case where the modified character string includes both of the output character string and the difference character string, an area on a periphery of the recommended area in the input business form image is searched to specify a character string area corresponding to the difference character string,
wherein in the updating,
in a case where the character string area corresponding to the difference character string is specified on the periphery of the recommended area, the area information about the specified similar business form being registered in the database is updated so that the updated area information indicates a position of an area obtained by connecting the specified character string area with the recommended area,
wherein the updated area information is used to determine a recommended area in a newly inputted business form image in a case where a feature of the newly inputted business form image to be input next time or later is similar to a feature of the specified similar business form.

2. The information processing apparatus according to claim 1, wherein
in the analyzing, in a case where the output character string includes both of the modified character string and the difference character string, a second character string area corresponding to the difference character string is specified from the recommended area in the input business form image, and
in the updating, in a case where the second character string area corresponding to the difference character string is specified from the recommended area, the area information about the specified similar business form being registered in the database is updated so that the updated area information indicates a position of an area obtained by excluding the specified character string area from the recommended area.

3. The information processing apparatus according to claim 1, wherein
in the updating, in response to instructions from a user, the area information about the specified similar business form, which is registered in the database, is updated.

4. An information processing method for recommending, based on results of character recognition for a character area within a business form image, a specific character string to be used for setting a property of the business form, the method comprising the steps of:
specifying a business form similar to an inputted business form image based on feature information indicating a feature of a specified business form registered in a database, wherein the database registers the feature information about the specified similar business form and area information about the specified similar business form in association with each other, the area information indicating a position of a character string area including a character string to be used for setting a property;
determining a recommended area in the inputted business form image based on the area information about the specified similar business form associated with the feature information about the specified similar business form;
outputting a character string included in the determined recommended area for setting a property of the input business form image;
analyzing a modified character string into which the outputted character string is modified by a user; and
updating the database, which registers the area information about the specified similar business form, based on results of the analysis,
wherein in the analyzing,
a difference character string between the output character string and the modified character string is obtained, and
in a case where the modified character string includes both of the output character string and the difference character string, an area on a periphery of the recommended area in the input business form image is searched to specify a character string area corresponding to the difference character string,
wherein in the updating,
in a case where the character string area corresponding to the difference character string is specified on the periphery of the recommended area, the area information about the specified similar business form being registered in the database is updated so that the updated area information indicates a position of an area obtained by connecting the specified character string area with the recommended area,
wherein the updated area information is used to determine a recommended area in a newly inputted business form image in a case where a feature of the newly inputted business form image to be input next time or later is similar to a feature of the specified similar business form.

5. A non-transitory computer readable storage medium storing a program for causing a computer to perform an information processing method for recommending, based on results of character recognition for a character area within a business form image, a specific character string to be used for setting a property of the business form, the method comprising the steps of:
specifying a business form similar to an inputted business form image based on feature information indicating a feature of a specified business form registered in a database, wherein the database registers the feature information about the specified similar business form and area information about the specified similar business form in association with each other, the area information indicating a position of a character string area including a character string to be used for setting a property;
determining a recommended area in the inputted business form image based on the area information about the specified similar business form associated with the feature information about the specified similar business form;
outputting a character string included in the determined recommended area for setting a property of the input business form image;
analyzing a modified character string into which the outputted character string is modified by a user; and
updating the database, which registers the area information about the specified similar business form, based on results of the analysis,
wherein in the analyzing,
a difference character string between the output character string and the modified character string is obtained, and
in a case where the modified character string includes both of the output character string and the difference character string, an area on a periphery of the recommended area in the input business form image is searched to specify a character string area corresponding to the difference character string,
wherein in the updating,
in a case where the character string area corresponding to the difference character string is specified on the periphery of the recommended area, the area information about the specified similar business form being registered in the database is updated so that the updated area information indicates a position of an area obtained by connecting the specified character string area with the recommended area,
wherein the updated area information is used to determine a recommended area in a newly inputted business form image in a case where a feature of the newly inputted business form image to be input next time or later is similar to a feature of the specified similar business form.

* * * * *